W. P. MARTYN.
POTATO-DIGGER.
No. 170,387. Patented Nov. 23, 1875.
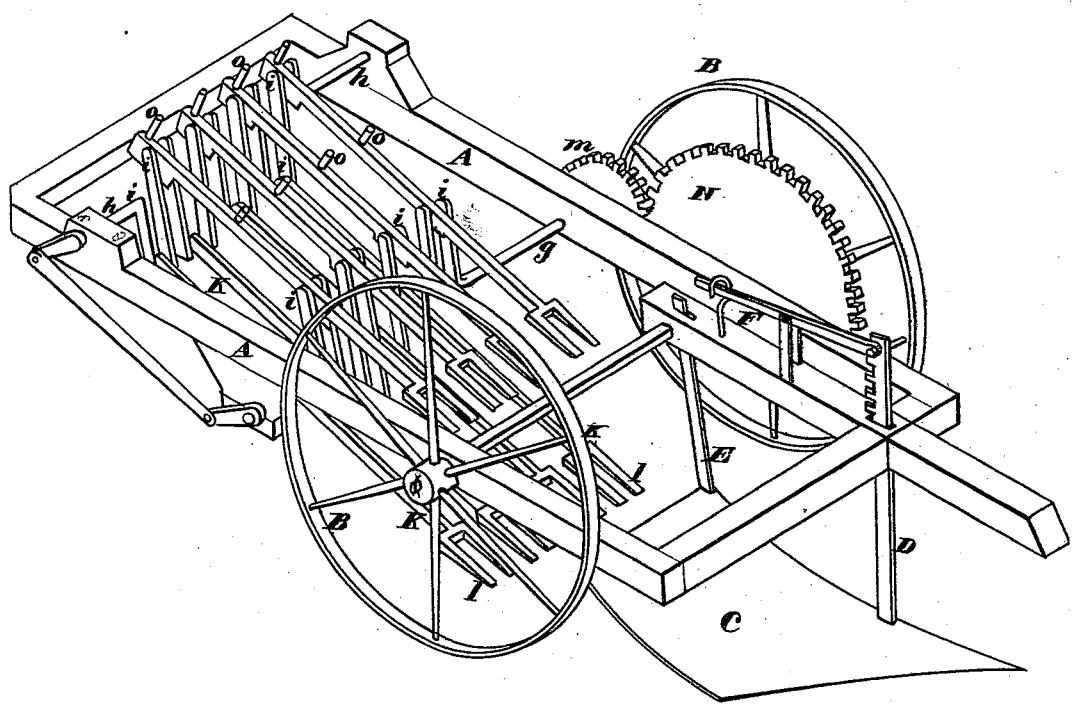
Witnesses
Geo. H. Strong
Jno. L. Boone
Inventor
William P. Martyn
by Dewey & Co
Atty s

UNITED STATES PATENT OFFICE.

WILLIAM P. MARTYN, OF SAN FRANCISCO, CALIFORNIA.

IMPROVEMENT IN POTATO-DIGGERS.

Specification forming part of Letters Patent No. 170,387, dated November 23, 1875; application filed May 25, 1875.

*To all whom it may concern:*

Be it known that I, WILLIAM P. MARTYN, of San Francisco city and county, State of California, have invented an Improved Potato-Digger; and I do hereby declare the following description and accompanying drawings are sufficient to enable any person skilled in the art or science to which it most nearly appertains to make and use my said invention or improvement without further invention or experiment.

My invention relates to an improved machine for unearthing potatoes and leaving them upon the surface of the ground separated from the soil so that they can be readily picked up.

My improvement consists in the employment of two reciprocating fork-frames, which are alternately forced into the ground in rear of the lifting-plow in the manner of digging with a fork, so as to lift the potatoes, shake them sufficiently to remove the adhering soil, and then deposit them in a line along one side of the machine upon the surface of the ground.

In order to more fully illustrate and explain my invention, reference is had to the accompanying drawing forming a part of this specification, in which—

Figure 1 is a perspective view of my digger.

A is a frame, which is mounted upon the two bearing-wheels B B, so that it can be drawn along the ground by horses. A lifting plow or shovel, C, is supported at the front end of the frame A by a standard, D, and brace-bar E. The standard D passes through the plow-beam, and has its upper end attached to one end of a lever, F, by means of which it can be raised or lowered through the beam, in order to raise the plow out of the ground, or lower it into the ground, as desired. Just behind the wheels B a shaft, $g$, extends across the frame A, being supported in bearings on the under side of the timbers of the frame, and another similar shaft, $h$, is secured in bearings above the timbers of the frame near its rear end. Each of these transverse shafts is constructed so as to form a double series of cranks, $i\ i\ i$, directly in rear of the shovel or plow C, one series being formed on each side of an imaginary straight shaft, and the cranks of one shaft being directly in line with the cranks of the other shaft. I then secure forks $k\ k\ k$ to these cranks, so that one set of forks will be attached to the cranks on one side of the imaginary straight shaft, while another set is attached to the opposite cranks. The forks $k\ k$ are constructed with digging-tines $l\ l$ at their lower ends, and their handles are attached to the forward set of cranks at or near their middles, while their rear ends are attached to the rear cranks. As the forward crank-shaft $g$ is supported in boxes below the timbers of the frame, while the rear shaft is supported above them, the forks will be supported and operated at an angle, and this angle can be increased or diminished by raising or lowering either of the crank-shafts. The forward crank-shaft $g$ has a pinion, $m$, on one end, which engages with a toothed wheel, N, which is secured to the hub of one of the bearing-wheels B, so that the revolution of the bearing-wheel causes the crank-shafts to be rotated. This motion of the crank-shafts will cause the forks $k\ k$ to be carried around in a circle while they remain at the same angle, and as the forks in each set alternate with the forks in the other set they will pass between each other twice in each revolution of the crank-shafts. The cranks will carry the forks into the ground with a digging action in rear of the plow and lift them alternately, so that they will lift the soil after it has been loosened by the plow, and shake it so as to separate the earth from the potatoes. Cranks $p$ on the opposite end of each shaft $g\ h$ are set at right angles to the inside cranks, and are connected by a rod, $q$, so as to prevent the inside cranks from stopping on the center. The shafts $g\ h$ are secured in the frame at an inclination, and the forks will, therefore, present an inclined plane toward one side of the machine, so that the potatoes will roll off to one side and be deposited along the surface of the ground. At intervals on the upper side of the fork-handles I secure pins $o\ o$, which serve to catch the weeds which are lifted by the forks, and as the forks move upward and backward, continually working between each other, the weeds will be lifted and carried over the upper end of the rakes.

I thus provide a simple and effective machine for digging potatoes. The plow will lift and loosen the soil, and the forks will lift and separate the potatoes and leave them upon the surface of the ground.

Having thus described my invention, what I claim, and desire to secure by Letters Patent, is—

1. The arrangement of the digging-forks $k$ $k$ and reciprocating-rakes $o$ $o$, to form a double inclined plane, substantially as and for the purpose described.

2. The reciprocating digging-forks $k$ $k$, having the pins or projections $o$ $o$, substantially as and for the purpose described.

WILLIAM P. MARTYN.

Witnesses:
 GEO. H. STRONG,
 JNO. L. BOONE.